Aug. 2, 1966   O. J. JOHNSON   3,263,479
ATTACHING DEVICE FOR HOSE FITTINGS
Filed June 26, 1963   2 Sheets-Sheet 1

INVENTOR.
Otto J. Johnson
BY John A. Hamilton
Attorney.

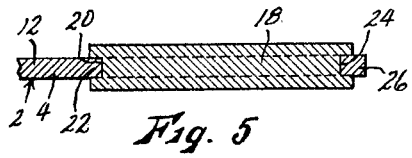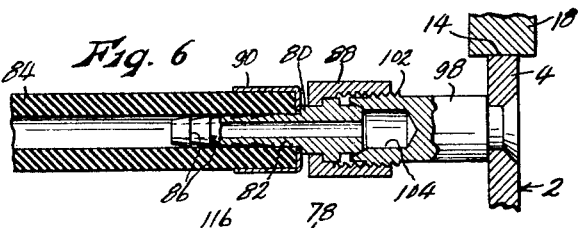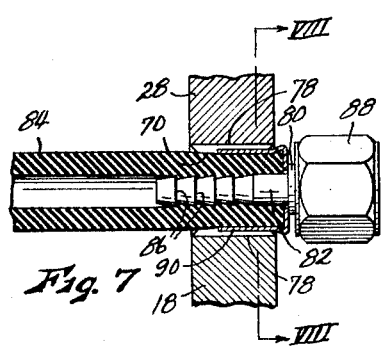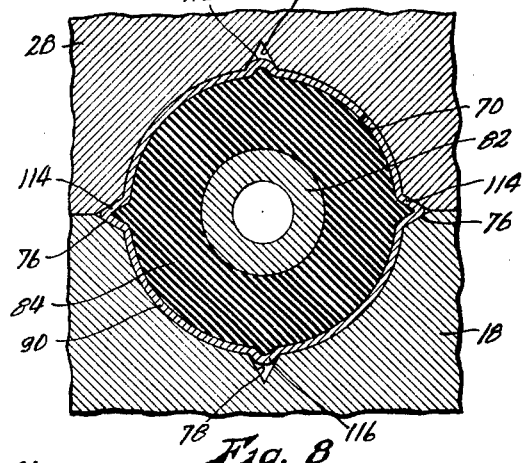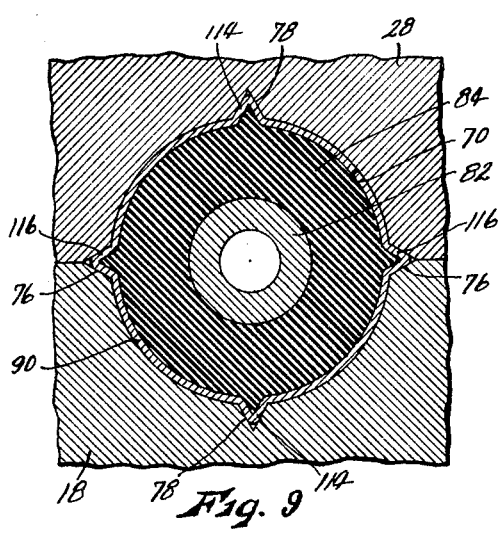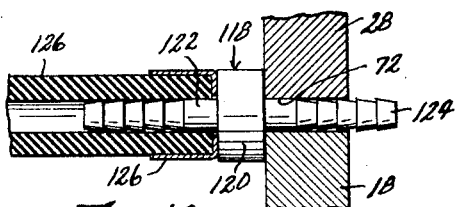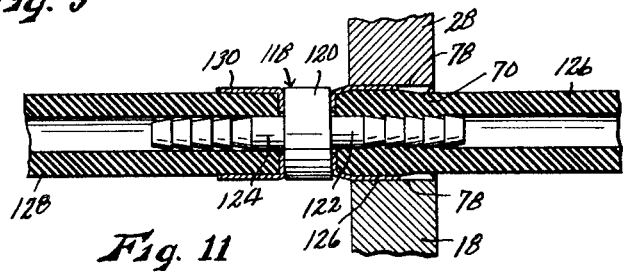

United States Patent Office 3,263,479
Patented August 2, 1966

3,263,479
ATTACHING DEVICE FOR HOSE FITTINGS
Otto J. Johnson, 6209 E. 11th St., Kansas City 26, Mo.
Filed June 26, 1963, Ser. No. 290,768
6 Claims. (Cl. 72—416)

This invention relates to new and useful improvements in devices for applying hose fittings to the ends of hoses, and has as its principal object the provision of a device having means which may serve both as a rigid support for a hose fitting when slipping the hose end over the nipple of the fitting, this often being a difficult operation when a stiff, thick-walled hose must be expanded to slide it over the nipple, and also as means for compressing or crimping a ferrule about the hose to clamp it tightly and permanently about said nipple.

Another object is the provision of a device of the character described having ferrule-crimping jaws which are supported in a novel manner whereby to insure that they will always align themselves to grip the ferrule accurately.

Still another object is the provision of a device of the character described having provision for interchanging the operative jaws thereof, whereby the device may be adapted for use with hose fittings of virtually any size.

Figures 1, 2:
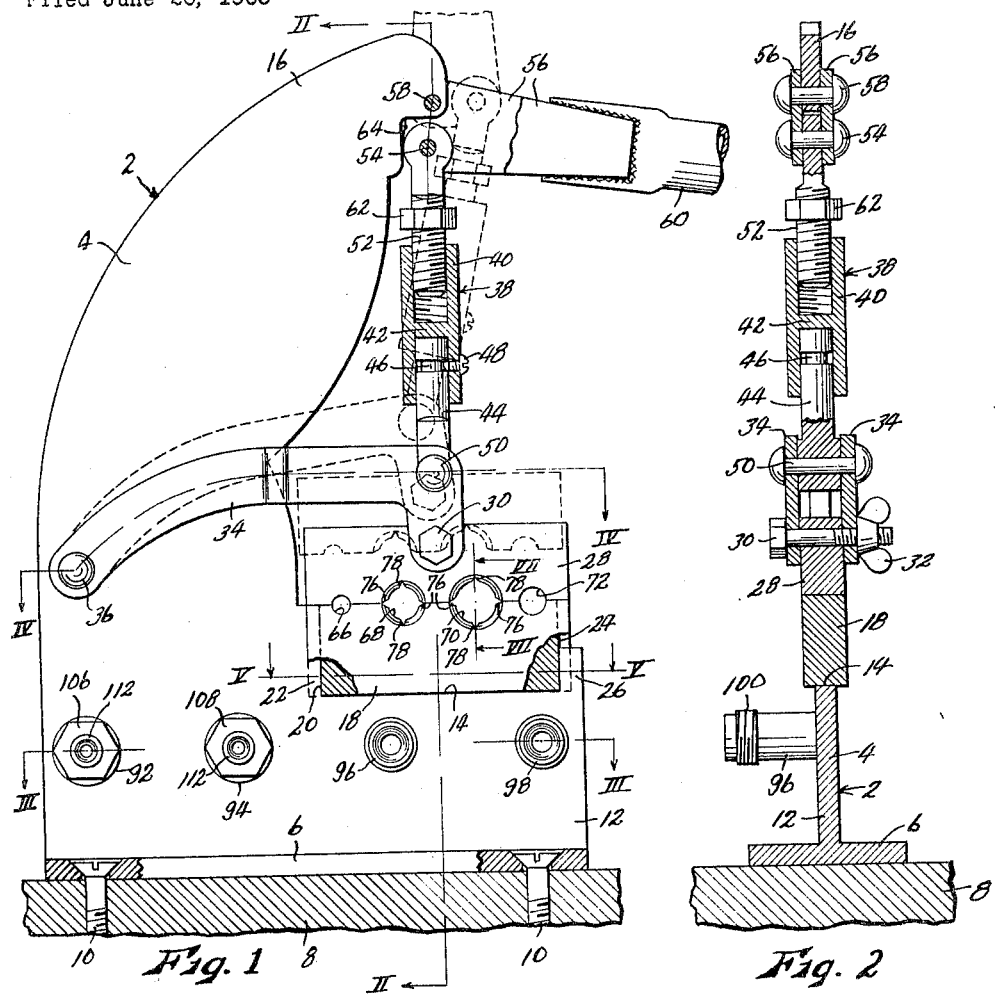
Figure 3:
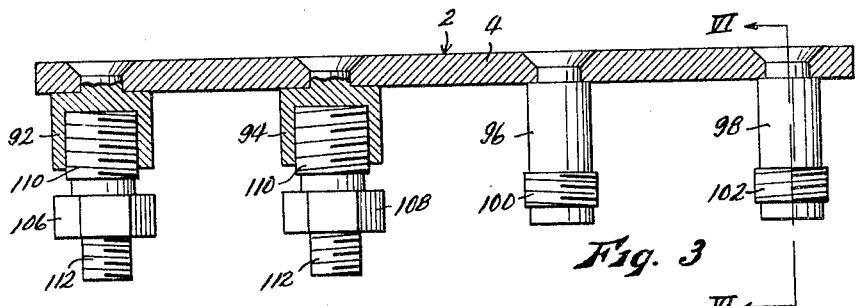
Figure 4:
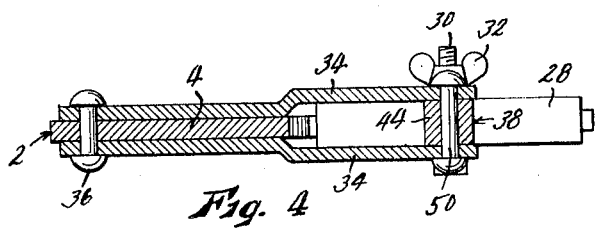

With these objects in view, as well as other objects which will appear in the course of the specification, reference will be had to the accompanying drawing wherein:

FIG. 1 is a side elevational view of a hose fitting applying device embodying the present invention, with portions broken away, FIG. 2 is a sectional view taken on line II—II of FIG. 1, with parts left in elevation, FIG. 3 is an enlarged sectional view taken on line III—III of FIG. 1, with parts left in elevation, FIG. 4 is a sectional view taken on line IV—IV of FIG. 1, FIG. 5 is a fragmentary sectional view taken on line V—V of FIG. 1, FIG. 6 is a fragmentary sectional view taken on line VI—VI of FIG. 3, with a female hose fitting supported by one of the fitting holders, and with a hose and ferrule slipped over the nipple of said fitting, FIG. 7 is an enlarged, fragmentary sectional view taken on line VII—VII of FIG. 2, showing the ferrule gripped between the jaws with the crimping operation partially completed, FIG. 8 is an enlarged, fragmentary sectional view taken on line VIII—VIII of FIG. 7, FIG. 9 is a view similar to FIG. 8 but showing the ferrule rotated 90 degrees from the position shown in FIG. 8, and with the crimping operation completed, FIG. 10 is a view similar to FIG. 7 showing one of the nipples of a splicer fitting clamped between the jaws, with a hose and ferrule slipped over the other nipple of said fitting, and FIG. 11 is a view similar to FIG. 10, showing the ferrule of FIG. 10 clamped in the jaws, and with another hose and ferrule slipped over the other nipple of the fitting.

Like reference numerals apply to similar parts throughout the several views, and the numeral 2 applies generally to a frame consisting of a vertically arranged plate 4 having a flange 6 at its lower edge, said flange being adapted to be affixed to a work bench or other rigid support 8 by screws 10 or the like, as best shown in FIG. 1. Said plate has a forward extension 12 the upper edge of which provides a horizontal jaw-supporting ledge 14, and said plate also forms an arm 16 which extends upwardly behind ledge 14 and curves forwardly in spaced apart relation above said ledge.

Ledge 14 supports a lower jaw 18 comprising a substantially rectilinear block. As best shown in FIGS. 1 and 5, said jaw is provided at its rearward edge with a vertical groove 20 which fits over a vertical edge portion 22 of plate 4 rising from the rearward end of ledge 14, and is provided at its forward edge with a vertical groove 24 engaging an ear 26 of plate 4 rising from the forward end of ledge 14. Thus while said lower jaw is rigidly supported against downward, lateral, and forward and rearward movement, it may easily be removed from the frame simply by lifting it upwardly, so that it may conveniently be interchanged with other jaws as will presently appear.

An upper jaw 28, also comprising a substantially rectilinear block, is disposed above lower jaw 18 for vertical movement toward and from said lower jaw. Said upper jaw is pivoted, as by a bolt 30 secured by a wing nut 32, between the forward ends of a pair of angled arms 34, said arms extending rearwardly along respectively opposite sides of plate 4 and being pivoted to said plate and adjacent its rearward edge as by rivet 36. Bolt 30 and rivet 36 are parallel to each other and normal to the plane of plate 4, so that pivotal movement of arms 34 causes upper jaw 28 to be moved vertically toward and from lower jaw 18, as indicated in dotted lines in FIG. 1. Bolt 30 is easily removable to provide interchangeability of the upper jaw.

Arms 34 are pivotally moved by a vertically extending push rod indicated generally at 38. Said push rod includes a central cylindrical sleeve 40 having a partition wall 42 intermediate its ends. A rod 44 is inserted axially in the lower portion of said sleeve so as to be rotatable therein, and has a peripheral groove 46 therein engaged by a screw 48 threaded in said sleeve, whereby said rod is retained rotatably in said sleeve. The upper end of said rod abuts partition wall 42, and the lower end of said rod extends downwardly from said sleeve and is pivoted at its lower end between arms 34 as by rivet 50, said rivet extending at right angles to the push rod and parallel to bolt 30. A screw 52 is threaded in the upper end of sleeve 40 and extends upwardly from said sleeve, being pivoted at its upper end by a rivet 54 between a pair of plates 56 disposed respectively at opposite sides of the upper end of frame arm 16. Said plates are pivoted to said frame arm by a rivet 58 spaced apart from rivet 54 and are welded to an elongated handle 60 which extends radially to rivet 58 to any desired length.

When handle 60 is rotated in a counter-clockwise direction on rivet 58, as shown in dotted lines in FIG. 1, it acts to elevate rivet 54, and functions through push rod 38 and arms 34 to raise upper jaw 28 above lower jaw 18 to permit insertion of parts between said jaws as will be described. When the handle is turned in a clockwise direction, jaw 28 is lowered to press against jaw 18, the manual pressure exerted on handle 60 being greatly increased by the toggle linkage consisting of plates 56 and push rod 38. If the length of the push rod is properly adjusted by turning sleeve 40 on screw 52, which adjustment may be fixed by turning a lock nut 62 threaded on said screw to abut the end of the sleeve, the jaws will be pressed together with the maximum required force just as the toggle reaches its dead-center position, that is, just as rivet 54 passes through a plane containing the axes of rivets 50 and 58. Actually, rivet 58 passes slightly past this dead-center position, and is arrested by abutment of the upper end of screw 52 with a shoulder 64 of frame arm 16. This locks the jaws in their clamped position, so that they constitute a vise, for purposes which will presently appear.

The mating surfaces of jaws 18 and 28 each have a series of semi-cylindrical grooves formed therein, said grooves of the two jaws cooperating, when the jaws are closed, to form a series of cylindrical bores 66, 68, 70 and 72. Bores 66 and 72 are intended for gripping the nipple portions of hose fittings as will presently appear, and are of plain cylindrical form. Bores 68 and 70 are utilized to crimp the ferrules of the hose fittings, being of somewhat larger diameters, and each has four V-grooves formed longitudinally in the walls thereof at the quarter points thereof. Grooves 76 are diametrically opposed at the juncture between the upper and lower jaws, each being formed by cooperating bevelled edges of the upper and lower jaws, and grooves 78 are diametrically opposed to each other and offset angularly 90 degrees from grooves 76.

FIGS. 6 and 7 illustrate a female hose fitting of the type adapted to be attached to a hose by the present device. Said fitting consists of a tubular body 80 one end of which is of reduced diameter to form a nipple 82 for receiving a hose 84 thereover, said nipple having peripheral grooves 86 formed therein, and the other end of which has a hollow nut 88 rotatably mounted thereon. In use, this fitting is adapted to be attached to a male fitting, not shown, which is also tubular and which has male threads at one end for engagement in nut 88 to secure the tubular body portions of the fitting together in communicating relationship. The male fitting may be attached directly, for example, to a pressure vessel to which fluid under pressure is to be supplied by the hose, or may be provided with a nipple corresponding to nipple 82 for attachment to another section of hose. The means of attaching either fitting to a hose also includes a cup-shaped ferrule 90 of thin, ductile material such as brass, which is of such diameter as to slide easily over the end of hose 84, the base of said ferrule being perforated to receive nipple 82 therethrough.

Rigidly affixed to frame plate 2 at any convenient location thereon are a series of fitting holders 92, 94, 96 and 98 for supporting the fittings while initially slipping the hoses thereover. This is normally a difficult operation, since the fittings are often quite small and difficult to grasp manually, and since the hoses are often quite stiff and thick-walled, and must be expanded somewhat to fit over the nipples. Holders 96 and 98 simulate the male half of a fitting, constituting straight rods riveted at one end in plate 2 and having male threaded portions 100 and 102 respectively at their outer ends for engaging the nut portion 88 of a female fitting as shown in FIG. 6. The outer ends of holders 96 and 98 are also socketed as shown at 104 in FIG. 6 to correspond to a standard male fitting, in order that the mating ends of the fitting and holder may engage the same as in a standard fitting. The threads 100 and 102 of holders 96 and 98 are respectively left and right handed, in order to accommodate female fittings of either type. Holders 92 and 94 are simply internally threaded female sockets with respectively left and right handed threads, and are adapted to receive and support nippled male fittings therein. As shown, they are of a size to receive male fittings corresponding in size to the female fittings adapted to be supported by holders 96 and 98. Also, adapters 106 may be mounted in holders 92 and 94. Said adapters each have a male threaded portion 110 at one end adapted to engage in the socket. As shown, the opposite ends of the adapters are each provided with a male threaded portion 112, respectively left and right handed, for mounting female hose fittings of a different size than those which may be supported on holders 96 and 98. However, it will be apparent that the outer ends of the adapters could be provided with either male or female threads of any size, so that a nippled hose fitting of any size, male or female, left or right handed, may be supported.

FIGS. 6–9 illustrate the application of a female hose fitting as previously described to a hose. The nut 88 of the fitting is first screwed onto the holder of the proper size and thread direction. A ferrule 90 is then slipped over the end of hose 84, and the hose is pushed on the nipple 82 of the fitting, as shown in FIG. 6. This operation often requires considerable manual force, for the reasons previously stated, but may be performed expeditiously with the present fitting due to the rigid support of the fitting. It may be further facilitated by lubricating the nipple. The fitting is then removed from holder 98, and ferrule 90 is placed in the crimping bore of the jaws which has the proper finished diameter for the particular ferrule being used, in this case bore 70. The jaws 28 and 18 are then brought forcibly together by operation of handle 60, as previously described. This compresses and reduces the diameter of ferrule 90, causing it to force the rubber or other compressible material of hose 84 into the grooves 86 of the nipple, so that the fitting is firmly anchored to the hose. The excess metal of the ferrule produced by reducing the diameter thereof is forced outwardly into grooves 76 and 78 of the crimping bore, whereby they form external, longitudinally extending ridges on the ferrule. The ridges formed in grooves 76 are indicated at 114 in FIG. 8, and the ridges formed in grooves 78 are indicated at 116.

There is a tendency for more metal to be forced into ridges 114 than into ridges 116, due to the extra drag of the bore walls on the ferrule at the extreme lateral portions of the crimping bore, so that the ridges 114 and 116 are unequal, as clearly shown in FIG. 8. This is not particularly objectionable, but the diameter of the ferrule increases somewhat by elastic rebound when the jaws are released, and the ridges may be equalized by rotating the ferrule 90 degrees so that ridges 114 will be engaged by grooves 78 and ridges 116 will be engaged by grooves 76, and again closing the jaws as shown in FIG. 9. This forces additional metal into ridges 116 to equalize them with ridges 114.

The snap action of toggle pivot 54 as it traverses its dead-center position serves a positive indication to the operator that the jaws are fully closed. The pivotal mounting of upper jaw 28 on bolt 30 insures proper alignment of the jaw grooves during the crimping operation. For example, the arcuate movement of jaw arms 34 causes a slight horizontal displacement of the upper jaw as it is elevated, and at the time it initially engages the ferrule. However, such initial contact pivots the upper jaw on bolt 30 so that the crimping groove thereof again engages said ferrule squarely. As the jaws approach each other more closely and the crimping operation proceeds, the upper jaw is gradually returned to its normal horizontal position by its engagement with the lower jaw.

FIGS. 10 and 11 illustrate the use of the device in applying a splicer fitting 118. Said fitting has a tubular body 120 forming hose nipples 122 and 124 respectively at opposite ends thereof. This type of fitting of course has no threads, and therefore is not adapted to be supported by any of the holders 92, 94, 96 or 98. In this case, as shown in FIG. 10, one nipple 124 is engaged in the nipple bore of the jaws which is of the proper diameter, in this case bore 72, and the jaws are closed to grip said nipple tightly. Screw 50 of the toggle is moved past its dead-center position to abut frame shoulder 64 to lock the jaws closed, whereby they constitute a vise. A hose 124 and ferrule 126 are then pushed over nipple 122 as shown in FIG. 2, in the same manner as previously described, and ferrule 126 is then crimped in bore 70 of the jaws, also as previously described. Then, leaving ferrule 126 clamped in bore 70, and with the jaws locked shut by the toggle to function as a vise, it will be seen that nipple 124 projects from the jaws and is rigidly supported thereby so that another hose 128 and ferrule 130 may be pushed thereover as shown in FIG. 11. Ferrule 130 is then crimped in the usual manner and the connection is complete.

Crimping bores 68 and 70 are of course intended for hose fittings of two different sizes, and nipple bores 66 and 72 may conveniently be sized to grip the nipples of the same two fitting sizes. However, both of the jaws are easily removable and may be interchanged with other jaws providing crimping and nipple bores of any desired size.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A device for applying a hose to a hose fitting including a tubular nipple adapted to enter said hose and a cylindrical malleable ferrule adapted to surround said hose and nipple, said device comprising:
    (a) a frame,
    (b) a jaw carried fixedly by said frame,
    (c) a jaw carried by said frame for movement toward and from said fixed jaw, said jaws having cooperating generally semicylindrical crimping grooves in the mating faces thereof for receiving said ferrule therebetween when the jaws are separated, said grooves cooperating to form a cylindrical bore when said jaws are closed to reduce the diameter of said ferrule,
    (d) an arm pivoted at one end to said movable jaw on an axis parallel to said crimping grooves and pivoted at its opposite end to said frame at a point remote from said movable jaw on an axis parallel to the pivotal axis of said movable jaw, whereby pivotal movement of said arm causes movement of said movable jaw away from said fixed jaw and also displaces said moveable jaw relative to said fixed jaw in a direction transverse to said crimping grooves, the pivotal connection of said movable jaw to said arm being remote from the mating surfaces of said jaws whereby pivotal movement of said movable jaw on said arm can return said crimping grooves into lateral alignment, and
    (e) operating means for moving said movable jaw toward and from said fixed jaw.

2. The structure as defined in claim 1 wherein said operating means functions to pivot said arm relative to said frame.

3. The structure as defined in claim 1 wherein said operating means comprises a toggle linkage consisting of a pair of links pivoted together and pivoted at their distal ends respectively to said arm and said frame, and including a handle affixed to one of said links for manually pivoting the same.

4. The structure as defined in claim 3 wherein one of the links of said toggle linkage is adjustable in length.

5. The structure as recited in claim 3 wherein said toggle linkage has a dead-center position which occurs when said jaws are clamped tightly together whereby said device constitutes a vise.

6. The structure as recited in claim 3 wherein said toggle linkage has a dead-center position which occurs when said jaws are clamped tightly together whereby said device constitutes a vise, and wherein said jaws are provided additionally with mating, substantially semi-cylindrical grooves which are of a size adapted to grip the nipples of hose fittings tightly therein when said jaws are clamped together.

References Cited by the Examiner
UNITED STATES PATENTS

| | | | |
|---|---|---|---|
| 1,677,968 | 7/1928 | Hughes | 29—155.55 |
| 2,627,649 | 2/1953 | Matthysse | 29—155.55 |
| 2,812,506 | 11/1957 | Merrill | 29—155.55 |
| 3,117,615 | 1/1964 | Graven | 72—391 |

CHARLES W. LANHAM, *Primary Examiner.*

R. D. GREFE, *Assistant Examiner.*